United States Patent [19]

Levanevsky et al.

[11] 3,876,706

[45] Apr. 8, 1975

[54] METHOD OF PRODUCING HYDROXY ALDEHYDES AND KETO-ALCOHOLS

[76] Inventors: Oleg Evgenievich Levanevsky, ulitsa Togaloka Moldo 97, Frunze; Faina Alexandrovna Demina, ulitsa Furmanova, 3, kv. 83, Penza; Alevtina Ivanovna Shirobokova, ulitsa Sechenova, 57, Frunze, all of U.S.S.R.

[22] Filed: Feb. 24, 1971

[21] Appl. No.: 118,542

[52] U.S. Cl............. 260/602; 252/455 Z; 252/457; 260/586; 260/594
[51] Int. Cl............................................ C07c 47/18
[58] Field of Search...... 260/602 R; 252/455 Z, 457

[56] References Cited
UNITED STATES PATENTS 1,878,040   9/1932   Voss .................................. 260/602
1,896,240   2/1933   Saeger ............................... 260/602

*Primary Examiner*—Donald G. Daus
*Assistant Examiner*—D. B. Springer
*Attorney, Agent, or Firm*—Waters, Roditi, Schwartz & Nissen

[57] ABSTRACT

A method of producing hydroxy aldehydes or keto-alcohols characterized in that aldehydes or ketones are reacted with formaldehyde with the use of a catalyst which is a kaolin calcined at a temperature of 500°–700°C, in the presence of a tertiary amine. The aforementioned kaolin may be promoted with magnesium or calcium hydroxides. The catalyst exhibits high activity over a prolonged period, viz. 3–5 years.

The present method may be used in producing polyhydric alcohols used in the manufacture of polymeric materials.

5 Claims, No Drawings

METHOD OF PRODUCING HYDROXY ALDEHYDES AND KETO-ALCOHOLS

The present invention relates to a method of producing hydroxy aldehydes and keto-alcohols. Hydroxy aldehydes are intermediates obtained in the production of polyhydric alcohols which are used in the manufacture of polyurethane and alkyd resins, varnishes etc. Keto- alcohols are employed in the production of polymeric materials.

Methods are known of producing polyhydric alcohols wherein hydroxy alcohols are the intermediate products. This relates substantially to the methods of producing polyhydric alcohols by the aldol condensation of aliphatic aldehydes with an excess of formaldehyde. The intermediately formed hydroxy alcohols are immediately reduced to polyhydric alcohols by formaldehyde. The process is carried out in an aqueous-alkaline solution in the presence of NaOH or $Ca(OH)_2$. The use of a strongly basic polystyrene anion exchange resin in OH-form as a catalyst is known. The condensation of aldehydes with formaldehyde with the formation of hydroxy aldehydes and reduction thereof to polyhydric alcohols is effected in one stage.

In the presence of alkalies, however, hydroxy aldehydes are produced along with other by-products such as ethers, acetals and glycols.

The disadvantage of the use of the anion exchange resin in OH-form is that its activity decreases rapidly.

A method is known of producing keto-alcohols by the aldol condensation of methyl ethyl ketone with formaldehyde with the employment of anion exchange resin, sold under the tradename Amberlit IRA-400, as the catalyst, in the presence of a tertiary amine. The yield of the desired product is 90.5%.

It has been described in the literature (Compt rend, 251, 1954) that use had been made of sulfonic acid cation exchange resin, sold under the tradename Amberlit IR-120, to condense cyclohexanones with some aliphatic aldehydes. The yield of the corresponding cyclic keto-alcohols did not exceed 20%.

The disadvantage of the known methods of producing keto-alcohols lies in the use of costly anion exchange resins as catalysts and in the low yield of some keto-alcohols.

It is an object of the present invention to provide a method of producing hydroxy aldehydes from which polyhydric alcohols of a high degree of purity can be produced by hydrogenation.

Another object of the invention is to provide a method of producing hydroxy aldehydes and keto-alcohols which utilizes a less costly catalyst than the anion exchange resins. Still another object of the invention is to provide a catalyst capable of not lowering its activity during a lengthy service life.

These objects have been accomplished by providing a method of producing hydroxy aldehydes and keto-alcohols by the catalytic condensation of aldehydes or ketones with formaldehyde in a basic medium. The novel feature of this method is that condensation is effected with the use of a catalyst comprising kaolin calcined at a temperature of 500°–700°C. It is advisable to promote said kaolin with 0.05–0.1% of an aqueous suspension of magnesium or calcium hydroxides before the process begins. This is attained by treating the calcined kaolin with the aforementioned suspensions, for example, by passing them through the kaolin. Additional active centers are created on the kaolin surface by promotion which intensify the condensation process and increase the yield of the desired product. The condensation process is carried out at a pH of 9.5–11.2 maintained at this level by a tertiary amine whose boiling point is lower than that of the condensation product. In case the starting reagents are immiscible or sparingly miscible, the condensation process should be performed in the presence of ethyl alcohol.

Preferably, use is made of a granular catalyst which is prepared in the following way. Kaolin is mixed with water and from the mass thus obtained granules are shaped which are dried and then calcined at a temperature of 500°–700°C for 4–5 hours whereupon the catalyst is ready for use.

According to the invention, the process is accomplished in the following manner. A mixture consisting of the aldehyde or ketone and an aqueous solution of formaldehyde is brought to a pH of 9.5–11.2 by adding a tertiary amine, e.g. triethylamine. For the condensation of aldehydes with formaldehyde, a pH within the range of 9.5–10.0 is maintained, the molar ratio being 1:3. For the condensation of ketone with formaldehyde the optimum pH is 11.0–11.2 the molar ratio being 30:1. In some cases ethyl alcohol is added to form a homogeneous solution. The said mixture is passed through the catalyst charged into a thermostatically controlled column. The process temperature is maintained 5°–10°C lower than the boiling point of the lowest boiling component of the mixture. The process is carried out under normal pressure, does not require complicated equipment and can be accomplished both in a continuous and batch manner. The condensation process is preferably conducted with the kaolin promoted with a 0.05–0.1% aqueous suspension of magnesium or calcium hydroxides. The reaction mixture is passed through a catalyst which is moist after promotion. As the starting aldehydes, in the condensation with formaldehyde, use can be made of acetaldehyde, propionaldehyde, n-butyraldehyde isobutyraldehyde, n-valeraldehyde and isovaleraldehyde. As the starting ketones in the condensation with formaldehyde, use can be made of acetone, methyl ethyl ketone, diethyl ketone, methyl propyl ketone, methyl butyl ketone, cyclohexanone, methylcyclohexanone and others.

The present method of producing hydroxy aldehydes and keto-alcohols makes it possible to cut the cost of the desired products by employing a less costly catalyst capable of operating for a long period, viz. 3–5 years without being renewed and giving, in a number of cases, higher yields of the desired products. For example, in conducting the cyclohexanone condensation with formaldehyde, the use of the present catalyst gives a hydroxymethylcyclohexanone yield of 80% while the use of sulfonic acid cation exchange resin, sold under the tradename Amberlit IR-120, gives a yield not higher than 20%.

Hydroxy aldehydes produced by the present method can be processed into polyhydric alcohols of a sufficient degree of purity by further hydrogenation without additional purification. Thus, the most labor-consuming step of producing polyhydric alcohols in the presence of the oxides of alkali metals and alkaline earth metals, viz. that of purifying them from formates is dispensed with.

EXAMPLE 1

The production of pentaerythrose. The condensation of acetaldehyde with formaldehyde is conducted at a molar ratio of 1:3. A mixture consisting of 200 ml of acetaldehyde, 1,200 ml of a 36% aqueous solution of formaldehyde, 400 ml of ethyl alcohol, and 20 ml of triethylamine to attain a pH of 9.5 for the medium, at a temperature of 14°–16°C and a rate of 2.5 ml/min is passed through a column filled with a catalyst comprising kaolin calcined to 600°C and promoted with an aqueous suspension of magnesium hydroxide. The column being 20 mm in dia and 400 mm high is provided with a jacket for thermostatic control. The mixture passed through the column is subjected to distillation. Ethyl alcohol and triethylamine are distilled off at normal pressure and can be recycled. The remaining reaction product is freed of water under reduced pressure. The yield of pentaerythrose is 467 g (96% of theory based on the acetaldehyde).

The catalyst is prepared in the following way. Kaolin is mixed with water to give a doughy mass and granules of 4–5 mm in dia. are made thereof. The granules are dried in a drying cabinet at 150°–200°C and then calcined in a muffle furnace at 600°C for 4–5 hours. The thus prepared catalyst is promoted directly in the column by passing 100 ml of a 0.1% aqueous suspension of magnesium hydroxide through the column. The reaction mixture is passed immediately through the catalyst which is moist after promotion.

EXAMPLE 2

The production of methyltriose. The condensation of propionaldehyde with formaldehyde is conducted at a molar ratio of 1:3. A mixture consisting of 75 ml of propionaldehyde, 300 ml of a 36% solution of formaldehyde, 80 ml of ethyl alcohol, and 7 ml of triethylamine to attain a pH of 9.5 for the medium, at a temperature of 30°C and a rate of 2.5 ml/min is passed through a column filled with kaolin processed as described in Example 1. Ethyl alcohol, triethylamine and the unreacted propionaldehyde are distilled of at normal pressure and recycled. The product is freed from water in vacuo to give methyltriose in a yield of 120 g (80% of theory based on the propionaldehyde).

EXAMPLE 3

The production of ethyltriose. The condensation of n-butyraldehyde with formaldehyde is conducted at a molar ratio of 1:3. A mixture consisting of 50 ml of n-butyraldehyde, 60 ml of a 36% solution of formaldehyde, 50 ml of ethyl alcohol and 5 ml of triethylamine to attain a pH of the mixture of 9.5, at a temperature of 40°C and a rate of 2.5 ml/min is passed through a column filled with kaolin as described in Example 1. Ethyl alcohol, triethylamine and the unreacted butyraldehyde are distilled off at normal pressure and a temperature of up to 100°C, whereupon the distillation is conducted in vacuo to remove water. The yield of ethyltriose is 60 g (82% of theory based on the aldehyde). The product is transparent and of a slight yellowish color.

EXAMPLE 4

The production of 3-hydroxymethylbutanone-2. The condensation of methyl ethyl ketone with formaldehyde is conducted at a molar ratio of 30:1. A mixture consisting of 1,100 ml of methyl ethyl ketone, 30 ml of a 36% solution of formaldehyde and 35 ml of triethylamine to attain a pH of 11.0 for the medium, at a temperature of 70°C and a rate of 2 ml/min is passed through a column filled with kaolin promoted by calcium hydroxide in a way described in Example 1. The unreacted substances are distilled off at ordinary pressure. An azeotrope consisting of methyl ethyl ketone, triethylamine and water is distilled off at 72°–74°C. 3-Hydroxymethylbutanone-2 is distilled at a reduced pressure of 92°–96°/30 mm Hg. The yield of the desired product is 33 g (90% of theory based on the formaldehyde).

EXAMPLE 5

The production of 3-hydroxymethylbutanone-2.

The condensation of methyl ethyl ketone with formaldehyde is conducted as described in Example 4, but unlike Example 4, the catalyst used is kaolin calcined at a temperature of 600°C (without promotion). The yield of the desired product is 26.4 g (72% of theory based on formaldehyde).

EXAMPLE 6

The production of 2-hydroxymethylcyclohexanone.

The condensation of cyclohexanone with formaldehyde is conducted at a molar ratio of 30:1. A mixture consisting of 600 ml of cyclohexanone, 16 ml of a 36% solution of formaldehyde, 300 ml of ethyl alcohol and 50 ml of triethylamine to attain a pH of 11.2 for the medium, at a temperature of 70°C and a rate of 1.5 ml/min, is passed through a column filled with calcined kaolin promoted with magnesium hydroxide. Ethyl alcohol and triethylamine is distilled off at normal pressure, the unreacted cyclohexanone being removed at a reduced pressure of 42°–44°/15 mm. 2-hydroxymethyl cyclohexanone is isolated at 112°–113°/15 mm Hg. The yield of the product is 20 g (80% of theory based on formaldehyde).

What we claim is:

1. A method for producing an hydroxyaldehyde comprising the step of condensing an aldehyde selected from the group consisting of acetaldehyde, propionaldehyde, n-butyraldehyde, isobutyraldehyde, n-valeraldehyde and isovaleraldehyde with formaldehyde in the presence of a catalyst, and ethanol as a solvent if necessary to form a homogeneous solution, and at a pH of 9.5–10.0 maintained by the presence of a tertiary amine whose boiling point is lower than that of the condensation product obtained, said catalyst comprising a kaolin calcined at a temperature of 500°–700°C. and the mole ratio of aldehyde to formaldehyde being 1:3.

2. A method according to claim 1, wherein the process is carried out using kaolin promoted with a 0.05–0.1% aqueous suspension of magnesium hydroxide.

3. A method according to claim 1, wherein the process is carried out using kaolin promoted with a 0.05–0.1% aqueous suspension of calcium hydroxide.

4. A method according to claim 1, wherein the temperature at which the process is carried out is 5°–10°C lower than the boiling point of the lowest boiling component of the mixture at normal pressure.

5. A process according to claim 1 wherein the tertiary amine is triethylamine.

* * * * *